US012695115B2

(12) United States Patent
Stock et al.

(10) Patent No.: US 12,695,115 B2
(45) Date of Patent: Jul. 28, 2026

(54) ELECTROCHEMICAL CELL

(71) Applicant: VARTA Microbattery GmbH,
Ellwangen Jagst (DE)

(72) Inventors: Stefan Stock, Rainau-Dalkingen (DE);
Edward Pytlik, Ellwangen (DE);
David Ensling, Ellwangen (DE);
Martin Elmer, Ellwangen (DE)

(73) Assignee: VARTA MICROBATTERY GMBH,
Ellwangen Jagst (DE)

( * ) Notice: Subject to any disclaimer, the term of this
patent is extended or adjusted under 35
U.S.C. 154(b) by 744 days.

(21) Appl. No.: 17/928,285

(22) PCT Filed: Apr. 28, 2021

(86) PCT No.: PCT/EP2021/061161
§ 371 (c)(1),
(2) Date: Nov. 29, 2022

(87) PCT Pub. No.: WO2021/239372
PCT Pub. Date: Dec. 2, 2021

(65) Prior Publication Data
US 2023/0223581 A1      Jul. 13, 2023

(30) Foreign Application Priority Data
May 29, 2020    (EP) ..................................... 20177373

(51) Int. Cl.
*H01M 10/04* (2006.01)
*H01M 4/04* (2006.01)
(Continued)

(52) U.S. Cl.
CPC ..... *H01M 10/0431* (2013.01); *H01M 4/0404*
(2013.01); *H01M 10/0422* (2013.01);
(Continued)

(58) Field of Classification Search
CPC ........... H01M 10/0431; H01M 4/0404; H01M
10/0422; H01M 10/0525; H01M 10/425;
(Continued)

(56) References Cited

U.S. PATENT DOCUMENTS 11,450,878 B2      9/2022   Im
2004/0247998 A1*  12/2004  Nakanishi ........... H01M 50/533
429/211
(Continued)

FOREIGN PATENT DOCUMENTS

CN          106099164       * 11/2016
CN          109065943       * 12/2018
(Continued)

OTHER PUBLICATIONS

Machine translation of CN109065943 (Year: 2025).*
(Continued)

*Primary Examiner* — Tong Guo
*Assistant Examiner* — Albert Michael Hilton
(74) *Attorney, Agent, or Firm* — Leydig, Voit & Mayer,
Ltd.

(57) ABSTRACT

An electrochemical cell includes a winding comprising a
ribbon-shaped negative electrode with an anode current
collector and a ribbon-shaped positive electrode with a
cathode current collector. An assembly comprises the nega-
tive electrode and the positive electrode, the assembly is
wound spirally around a winding axis to form the winding,
the winding comprises a central cavity, two terminal end
faces, and a circumferential winding shell. The electro-
chemical cell further includes a contact sheet metal member
in direct contact with a protruding longitudinal edge of the
anode current collector or the cathode current collector. In
addition, the electrochemical cell includes a housing, a
sensor apparatus configured detect changes in a state of the
(Continued)

winding, and a display and/or a contact configured to display measured values and/or via which the measured values can be transmitted.

15 Claims, 4 Drawing Sheets

(51) Int. Cl.

| | |
|---|---|
| *H01M 10/0525* | (2010.01) |
| *H01M 10/42* | (2006.01) |
| *H01M 10/48* | (2006.01) |
| *H01M 50/107* | (2021.01) |
| *H01M 50/569* | (2021.01) |

(52) U.S. Cl.
CPC ..... *H01M 10/0525* (2013.01); *H01M 10/425* (2013.01); *H01M 10/486* (2013.01); *H01M 50/107* (2021.01); *H01M 50/569* (2021.01)

(58) Field of Classification Search
CPC . H01M 10/486; H01M 50/107; H01M 50/569
See application file for complete search history.

(56) References Cited

U.S. PATENT DOCUMENTS

| | | | | |
|---|---|---|---|---|
| 2012/0015224 | A1 | 1/2012 | Pytlik et al. | |
| 2012/0100406 | A1 | 4/2012 | Gaugler | |
| 2013/0009604 | A1* | 1/2013 | Bhardwaj ........... | H01M 10/425 320/136 |
| 2015/0064525 | A1 | 3/2015 | Henrici et al. | |
| 2015/0311571 | A1 | 10/2015 | Krauss | |
| 2017/0077560 | A1* | 3/2017 | Kemp ................... | H01M 10/48 |
| 2018/0331399 | A1 | 11/2018 | Shimizu | |
| 2019/0296405 | A1 | 9/2019 | Tang et al. | |
| 2021/0066742 | A1* | 3/2021 | Im ..................... | H01M 10/0422 |

FOREIGN PATENT DOCUMENTS

| | | | | | | |
|---|---|---|---|---|---|---|
| CN | 110867622 | A | | 3/2020 | | |
| DE | 102012223480 | A1 | | 6/2014 | | |
| DE | 102014206832 | A1 | | 10/2015 | | |
| DE | 202017006038 | U1 | | 2/2019 | | |
| EP | 1076371 | B1 | | 10/2011 | | |
| EP | 3376582 | A1 | | 9/2018 | | |
| EP | 3637534 | A1 | | 4/2020 | | |
| FR | 2986867 | A1 | | 8/2013 | | |
| JP | 2001313078 | A | | 11/2001 | | |
| JP | 2004-119330 | A | | 4/2004 | | |
| JP | 2005235624 | A | | 9/2005 | | |
| JP | 2017-91890 | A | | 5/2017 | | |
| KR | 101948626 | B1 | * | 5/2019 | ........ | H01M 10/0587 |
| KR | 20190090340 | A | * | 8/2019 | ........... | H01M 10/48 |
| KR | 20200025056 | A | | 3/2020 | | |
| WO | WO 2010089152 | A1 | | 8/2010 | | |
| WO | WO 2010146154 | A2 | | 12/2010 | | |
| WO | WO 2012048995 | A1 | | 4/2012 | | |
| WO | WO 2013120668 | A1 | | 8/2013 | | |
| WO | WO 2017215900 | A1 | | 12/2017 | | |

OTHER PUBLICATIONS

Machine translation of KR-101948626-B1 (Year: 2025).*
Machine translation of KR-20190090340-A (Year: 2025).*
Machine translation of CN106099164 (Year: 2025).*
International Electrotechnical Commission, "IEC/EN 61951-1," Feb. 2023, pp. 1-9, Switzerland.
International Electrotechnical Commission, "IEC/EN 60622," Oct. 2002, pp. 1-18, Switzerland.
International Electrotechnical Commission, "IEC/EN 61951-2," Mar. 2017, pp. 1-48, Switzerland.
International Electrotechnical Commission, "IEC/EN 61960," Feb. 2017, pp. 1-50, Switzerland.
International Electrotechnical Commission, "IEC/EN 61056-1," Feb. 2012, pp. 1-23, Switzerland.

* cited by examiner

ELECTROCHEMICAL CELL

CROSS REFERENCE TO RELATED APPLICATIONS

This application is a U.S. National Phase application under 35 U.S.C. § 371 of International Application No. PCT/EP2021/061161, filed on Apr. 28, 2021, and claims benefit to European Patent Application No. EP 20177373.6, filed on May 29, 2020. The International Application was published in German on Dec. 2, 2021 as WO 2021/239372 A1 under PCT Article 21(2).

FIELD

The present disclosure relates to an electrochemical cell and, in particular, to a secondary electrochemical cell and a method of manufacturing such an electrochemical cell.

BACKGROUND

In electrochemical cells, an electrochemical, energy-supplying reaction takes place which is composed of two electrically coupled but spatially separated partial reactions. One partial reaction, which takes place at a comparatively lower redox potential, occurs at the negative electrode, and one at a comparatively higher redox potential occurs at the positive electrode. During discharge, electrons are released at the negative electrode as a result of an oxidation process, resulting in an electron flow via an external consumer to the positive electrode, from which a corresponding quantity of electrons is taken up. A reduction process thus takes place at the positive electrode. At the same time, for the purpose of charge equalization, an ion current corresponding to the electrode reaction occurs within the electrochemical cells. This ion current crosses the separator and is ensured by an ion-conducting electrolyte.

In secondary (rechargeable) electrochemical cells, this discharge reaction is reversible, so it is possible to reverse the conversion of chemical energy into electrical energy that occurred during discharge.

When the terms "anode" and "cathode" are used in connection with secondary electrochemical cells, the electrodes are generally named according to their discharge function. The negative electrode in such cells is thus the anode, the positive electrode the cathode.

A well-known example of a secondary electrochemical cell is the lithium-ion cell. It comprises electrodes that can reversibly absorb and release lithium ions, as well as an electrolyte containing lithium ions.

Lithium-ion cells generally contain their electrodes and separators in the form of an assembly. Such an assembly can be a cell stack consisting of several cells. In most cases, however, the assembly is a single cell in wound form (winding assembly or winding cell in short).

In the assemblies, positive and negative electrodes and separators generally lie flat on top of each other. In most cases, the electrodes and separators are connected, for example, by lamination or by bonding. Generally, composite assemblies comprise the sequence positive electrode/separator/negative electrode, regardless of whether they are wound or not. Frequently, assemblies are manufactured as so-called bi-cells with the possible sequences negative electrode/separator/positive electrode/separator/negative electrode or positive electrode/separator/negative electrode/separator/positive electrode.

For automotive applications or other applications with high energy requirements, several wound electrochemical cells are often connected to form a battery module for generating high voltages. Deviations from normal operation of just one of the cells can result in damage to the entire module. It is therefore desirable to monitor the operation of the cells, since by means of monitoring problematic states of the cells can be detected in time and appropriate measures can be initiated.

Various approaches are already known for integrating sensor technology in electrochemical cells. For example, international patent application WO 2013/120668 A1 describes a sensor device for a cell of an electrical energy storage device, wherein, in addition to a reference electrode within the housing of the cell, a device for recording sensor data is provided, wherein the device is connected to the anode and the cathode. Hereby, for example, data on the temperature and/or the pressure in the cell can be acquired.

The German patent application publication DE 10 2012 223 480 A1 describes a cell having a device for monitoring at least one parameter of the cell, said device comprising at least one sensor, for example a chemical sensor or a voltage sensor. The operating voltage required for operation of the monitoring device is drawn off from the cell.

SUMMARY

In an embodiment, the present disclosure provides an electrochemical cell. The electrochemical cell includes a winding comprising a ribbon-shaped negative electrode, the negative electrode comprising an anode current collector and an electrochemically active anode component applied to the anode current collector, and a ribbon-shaped positive electrode, the positive electrode comprising a cathode current collector and an electrochemically active cathode component applied to the cathode current collector. An assembly comprises the negative electrode and the positive electrode, the negative electrode and the positive electrode are separated from each other a separator, the assembly is wound spirally around a winding axis to form the winding, and the winding comprises a central cavity through which the winding axis passes. The winding further comprises two terminal end faces and a circumferential winding shell. The negative electrode and the positive electrode are configured and/or arranged within the assembly relative to each other such that a protruding longitudinal edge of the anode current collector protrudes from one of the terminal end faces and a protruding longitudinal edge of the cathode current collector protrudes from the other of the terminal end faces of the winding. The electrochemical cell further includes a contact sheet metal member in direct contact with a respective protruding longitudinal edge and connected to the respective protruding longitudinal edge by welding. The respective protruding longitudinal edge is the protruding longitudinal edge of the anode current collector or the protruding longitudinal edge of the cathode current collector. The electrochemical cell further includes a housing having a first end face, a second end face, and an annular housing shell sealingly enclosing an interior space in which the winding is disposed. The electrochemical cell additionally includes a sensor apparatus configured to qualitatively and/or quantitatively detect changes in a state of the winding, the sensor apparatus being at least partially arranged in the central cavity. Furthermore, the electrochemical cell includes a display and/or a contact configured to display measured values detected by the sensor apparatus and/or via which the measured values can be transmitted to a receiver and/or an evaluator.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
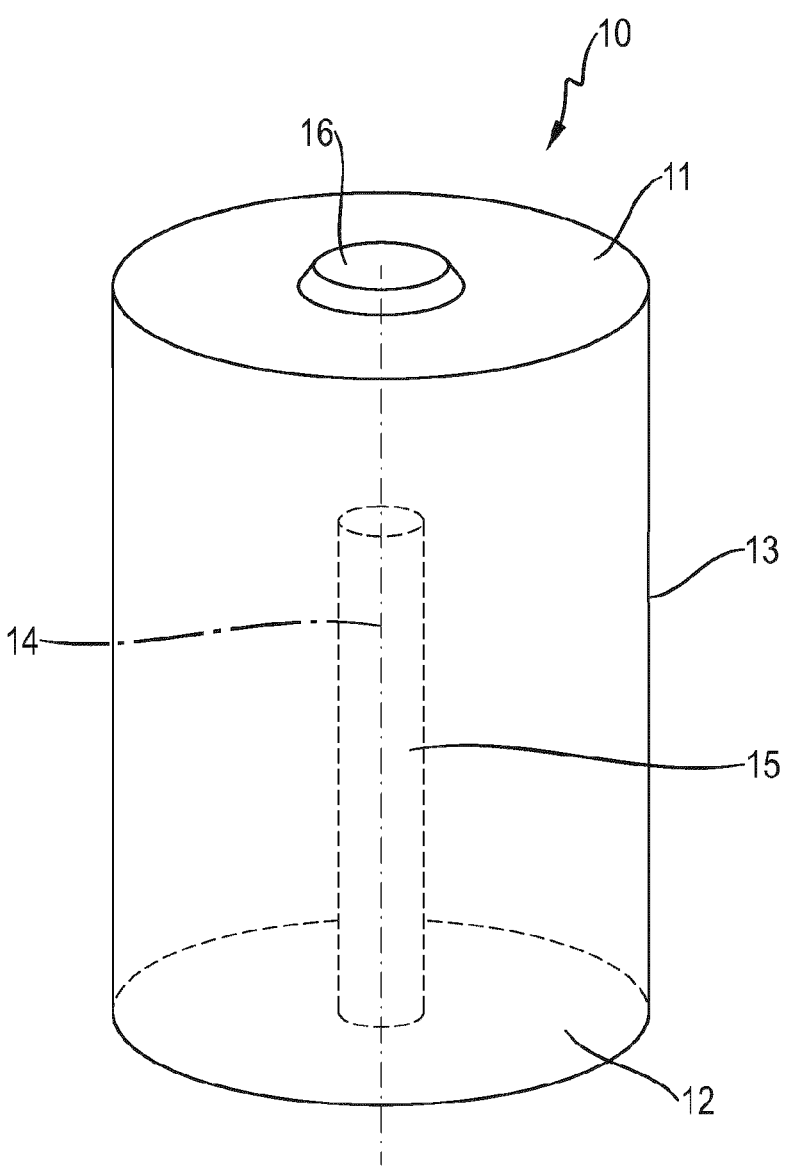
FIG. 1 provides a view of a cylindrical round cell with a tubular elongated carrier body in the central cavity of the round cell.

The present disclosure provides a technical solution that allows the operation of individual electrochemical cells in a battery module to be monitored. The solution should be as easy as possible to integrate into the process of manufacturing the electrochemical cells.

According to a first aspect of the disclosure, an electrochemical cell including the following features is provided:

a. the cell comprises at least one ribbon-shaped negative electrode, b. the cell comprises at least one ribbon-shaped positive electrode, c. the at least one negative electrode and the at least one positive electrode form an assembly and are separated from each other by at least one separator, d. the assembly of the at least one negative electrode, the at least one separator and the at least one positive electrode is wound around a winding axis and forms a winding, e. the winding comprises a central cavity through which the winding axis passes, f. the cell has a housing having first and second end faces and an annular housing shell sealingly enclosing an interior space in which the winding is disposed.

The particular characterizing features of the cell are as follows:

g. At least one sensor means or at least a part of a sensor means, which is capable of qualitatively and/or quantitatively detecting state changes of the winding, is arranged in the central cavity and h. on the first and/or the second end face there is a display means and/or a contact means which can display measured values detected by the at least one sensor means and/or via which these measured values can be transmitted to a receiving unit and/or an evaluation unit.

In particularly preferred embodiments, the electrochemical cell according to the first aspect is characterized by the following features:

a. the cell comprises at least one ribbon-shaped negative electrode, b. the cell comprises at least one ribbon-shaped positive electrode, c. the at least one negative electrode and the at least one positive electrode each comprise a current collector and an electrochemically active component applied to the current collector, d. the at least one negative electrode and the at least one positive electrode form an assembly and are separated from each other by at least one separator, e. the assembly comprising the at least one negative electrode, the at least one separator and the at least one positive electrode is wound spirally around a winding axis and forms a winding, the winding having two terminal end faces and a circumferential winding shell, f. the negative electrode and the positive electrode are configured and/or arranged within the assembly relative to each other such that a longitudinal edge of the current collector of the negative electrode protrudes from one of the terminal end faces and a longitudinal edge of the current collector of the positive electrode protrudes from the other of the terminal end faces of the winding, g. the cell comprises at least one contact sheet metal member which is in direct contact with one of the protruding longitudinal edges and which is connected to this longitudinal edge by welding, h. the winding comprises a central cavity through which the winding axis passes, i. the cell has a housing having first and second end faces and an annular housing shell sealingly enclosing an interior space in which the winding is disposed, k. at least one sensor means or at least a part of a sensor means, which is capable of qualitatively and/or quantitatively detecting state changes of the winding, is arranged in the central cavity and l. on the first and/or the second end face there is a display means and/or contact means which can display measured values detected by the at least one sensor means and/or via which these measured values can be transmitted to a receiving unit and/or an evaluation unit.

The cell according to the first aspect is thus characterized in particular by the fact that the central cavity of the winding is used functionally by arranging the at least one sensor means or the at least one part of the sensor means therein. With the aid of the sensor means or the sensor means, changes in the condition of various types of the winding can be detected, thereby enabling condition monitoring and/or diagnosis of the cell, depending on the design of the sensor means. By arranging the sensor means or parts of the sensor means in the central cavity of the winding, a particularly easy-to-implement and practicable solution for equipping an electrochemical cell with sensor means is provided.

The aforementioned changes in state are understood here to be properties of the cell that have a significance for the function of the cell. In particular, pressure changes, temperature changes and/or voltage changes play a role here.

In principle, the arrangement of the sensor means or parts of the sensor means described here is suitable for both rechargeable (secondary) and non-rechargeable (primary) cells. However, since the need for a monitoring function is generally less for primary cells, and since the expense associated with a sensor means may not be in balanced proportion to its benefit for primary cells, the arrangement of the sensor means according to the concept described is advantageous primarily for secondary cells. The cell according to the first aspect is therefore preferably a secondary electrochemical cell.

Preferably, the ribbon-shaped anode and the ribbon-shaped cathode are offset from each other within the electrode-separator assembly to ensure that the first longitudinal edge of the anode current collector protrudes from one of the terminal end faces and the first longitudinal edge of the cathode current collector protrudes from the other of the terminal end faces.

The offset arrangement and the contacting of the protruding longitudinal edge(s) of the respective current collectors with the at least one contact sheet metal member allow the particular advantages of the sensor system arranged inside the winding to be utilized in a particularly advantageous and synergetic manner.

Preferably, the at least one contact sheet metal member, which is in direct contact with one of the protruding longitudinal edges and is joined thereto by welding, rests directly on said longitudinal edge.

In preferred embodiments, the contact sheet metal member is plate-shaped, i.e. in the form of a contact plate. The cell thus preferably comprises at least one contact plate which rests on the longitudinal edge or edges formed for contacting.

The longitudinal edge or edges protruding from the end faces are preferably designed for contacting a part of the housing of the cell. For this purpose, the longitudinal edges may, for example, be kept free of the respective electrochemically active component, or may have been freed from the respective electrochemically active component.

Preferably, therefore, the anode current collector and/or the cathode current collector have at least one free edge strip which extends along one of their longitudinal edges and which is not loaded with the electrode material.

For contacting, the respective longitudinal edges of the electrodes are preferably free of electrode material. The longitudinal edge or edges are preferably connected directly to the respective contact sheet metal member, in particular the contact plate, in an electrically conductive manner. The contact sheet metal member, in particular the contact plate, may be a part of the housing of the cell. In alternative embodiments, it is electrically connected to a housing part. Contacts of this type are described in detail in WO 2017/215900 A1. Full reference is hereby made to WO 2017/215900 A1.

In the manufacture of assemblies of electrodes and separators, care is usually taken to ensure that oppositely poled current collectors do not protrude from same the end faces, as this can increase the risk of short circuits. In the staggered arrangement described, however, the risk of short circuits is minimized because the current collectors with opposite polarity protrude from opposite end faces of the winding.

The protrusion of the current collectors resulting from the offset arrangement can be used to draw an advantage by contacting the longitudinal edges, if possible, over their entire length, by means of appropriate diverters. Contact plates such as those described in WO 2017/215900 A1 are particularly suitable as diverters. The contact plates described here can also significantly reduce the internal resistance within the cell according to the first aspect. The arrangement described can thus absorb the occurrence of large currents very well.

With minimized internal resistance, thermal losses at high currents are reduced.

Overall, the cell according to the first aspect is characterized by particularly good temperature behavior as a result of contacting the longitudinal edges of the current collectors via contact sheet metal members. In combination with the sensor system provided inside the winding according to the first aspect, the cells according to the first aspect thus offer the possibility of optimum condition management of the cells.

Preferably, the contact sheet metal member, in particular the contact plate, is a metal plate with a thickness in the range of 200 $\mu$m to 1000 $\mu$m. Preferably, the contact sheet metal member, in particular the contact plate, consists of aluminum, titanium, nickel, stainless steel or nickel-plated steel.

There are several ways in which the contact sheet metal member, especially the contact plate, can be connected to the longitudinal edge. It is important that the connection between the contact sheet metal member and the edge strips of the anode current collectors or the cathode current collectors is a direct connection. The direct connection of the contact sheet metal member to the current collectors of the electrodes can provide excellent heat dissipation characteristics. The contact sheet metal member(s) may be directly connected to the housing in an electrically conductive manner, or the contact sheet metal member(s) may be part of the housing. The contact sheet metal member, in particular the contact plate, may be in contact with the longitudinal edge along a line-shaped contact zone. The longitudinal edge can comprise one or more sections, each of which is continuously connected to the contact sheet metal member, in particular the contact plate, over its entire length by a weld seam.

In a possible development, the section or sections connected continuously to the contact sheet metal member, in particular the contact plate, over their entire length may extend over at least 25%, preferably over at least 50%, particularly preferably over at least 75%, of the total length of the respective longitudinal edge.

In some embodiments, the longitudinal edge or edges may be continuously welded to the contact sheet metal member, particularly the contact plate, along their entire length.

The at least one contact sheet metal member, in particular the contact plate, may have at least one slot and/or at least one perforation. These have the function of counteracting deformation of the sheet metal, in particular the plate, during the production of the welded joint.

In preferred embodiments, the contact sheet metal member, in particular the contact plate, has the shape of a disk, in particular the shape of a circular or at least approximately circular disk. It then has an outer circular or at least approximately circular disc edge. An approximately circular disc is to be understood here in particular as a disc which has the shape of a circle with at least one cut off circular segment, preferably with two to four cut off circular segments.

Particularly preferably, the cell according to the first aspect has a first contact sheet metal member, in particular a first contact plate, which rests on the longitudinal edge of the current collector of the negative electrode, so that a line-shaped first contact zone with a spiral geometry results, and a second contact sheet metal member, in particular a second contact plate, which rests on the longitudinal edge of the current collector of the positive electrode, so that a line-shaped second contact zone with a spiral geometry results.

In particularly preferred embodiments, the first contact sheet metal member, in particular the first contact plate, and the current collector of the negative electrode both consist of the same material. This is particularly preferably selected from the group comprising copper, nickel, titanium, nickel-plated steel and stainless steel.

The second contact sheet metal member, in particular the second contact plate, and the current collector of the positive electrode particularly preferably both consist of the same material from the group comprising aluminum, nickel, titanium, nickel-plated steel and stainless steel.

The sensor means of the cell according to the first aspect may comprise different types of sensors or sensor means. In particularly preferred embodiments, at least one of the immediately following additional features a. to c. is provided:

a. The at least one sensor means comprises or is a reference electrode.

b. The at least one sensor means comprises a temperature sensor or is a temperature sensor.

c. The at least one sensor means comprises a pressure sensor or is a pressure sensor.

In particularly preferred embodiments, the at least one sensor means comprises the reference electrode and the temperature sensor. Furthermore, a combination of the reference electrode and the pressure sensor may also be preferred. Further, a combination of the temperature sensor and the pressure sensor may be preferred. In a particularly preferred manner, a combination of reference electrode, temperature sensor and pressure sensor is preferred.

In addition, the at least one sensor means may also comprise other sensor means, for example gas sensors, in particular for detecting various chemical substances that may be released in the cell. Gas sensors may, for example, be based on an optical measurement principle or on other measurement principles. Furthermore, other sensors, for example other optical sensors, may also be used.

By means of the reference electrode, it is possible to measure an electrode potential of the cell. Electrode potentials are an important measured variable for assessing the state of the cell, for example the state of charge. In particular, the potential difference between the reference electrode and the negative electrode and/or the reference electrode and the positive electrode can be recorded in this way.

The temperature sensor can be used to record and monitor the temperature inside the cell. The temperature also allows conclusions to be drawn about the condition of the cell. In particular, excessive heating (core overheating) can be detected, which can have a very detrimental effect on the cell's functionality. Furthermore, a temperature sensor can also be used to detect a temperature that is too low, which is unfavorable for a charging process, for example. In particular, a temperature sensor allows thermal management of the cell.

The temperature sensor can be an optical sensor, e.g. an infrared sensor. However, the temperature sensor can also comprise a thermocouple or an electronic temperature sensor that changes its resistance as a function of temperature.

The pressure sensor can be used in particular to record the internal cell pressure (winding pressure), which also allows conclusions to be drawn about the condition of the cell. An increasing internal pressure within the cell can indicate a decomposition of the electrolyte, which is associated with a corresponding outgassing, so that the gas pressure increases.

With respect to the reference electrode, in preferred embodiments the cell is characterized in particular by at least one of the immediately following additional features a. and b.:

a. The reference electrode is located in the central cavity.

b. The sensor means comprises at least one connection means via which measured values determined by the reference electrode can be transmitted to the display and/or contact means.

In preferred embodiments, the immediately preceding features a. and b. are realized together.

In a particularly preferred embodiment, the cell is characterized with respect to the reference electrode by the immediately following feature a.:

a. The reference electrode comprises lithium or a lithium-containing material and the at least one connection means is an electrical conductor.

The electrical conductor is in electrical contact with the lithium or lithium-containing material, preferably in direct contact with it.

The use of lithium or a lithium-containing material for the reference electrode is of course particularly advantageous if the cell according to the first aspect is a lithium-ion cell. As already explained, the defined potential of lithium or the lithium-containing material can be used as a reference for measuring a potential difference.

Furthermore, the lithium or the lithium-containing material can also serve as a lithium depot. Lithium-ion cells depend on the availability of free lithium or lithium ions, whereby the content of available free lithium (mobile lithium) decreases over the operating life of the cell. Therefore, by adding an additional lithium source within a cell, the lifetime of a lithium-ion cell can be extended. It is thus possible to supply lithium from the depot to the electrodes of the cell as needed, or to remove excess lithium from the electrodes to prevent lithium plating. For this purpose, the electrode serving as the lithium depot can be connected against the negative or against the positive electrode of the lithium-ion cell, for example via the electrical conductor, which can also serve as connection means. Excess lithium can be supplied to the lithium depot and deposited there if required. For these applications, means can be provided that allow separate monitoring of the individual potentials of the anode and cathode in the cell and/or external monitoring of the cell balance via electrochemical analyses such as DVA (differential voltage analysis).

One end of the electrical conductor is preferably in electrical contact with the reference electrode or the lithium or lithium-containing material of the reference electrode, and another end of the electrical conductor is in electrical contact with the display means and/or contact means. The reference electrode forms a third pole of the cell in addition to the positive pole and the negative pole of the cell.

The electrical conductor and the reference electrode or lithium depot connected to it must be, as the third pole, electrically insulated against the other two poles of the cell, i.e. the positive and negative electrodes and any further cell components electrically coupled to them.

The lithium or the lithium-containing material of the reference electrode or the lithium depot can be, for example, metallic lithium, a lithium metal oxide, a lithium metal phosphate or other materials familiar to the skilled person. Usually, these materials are in contact with an electrolyte. The embodiment of the reference electrode with lithium or with a lithium-containing material is particularly well suited to detect lithium plating in good time and, if necessary, to prevent it.

With respect to the temperature sensor, the cell is advantageously characterized by at least one of the immediately following additional features a. and b.:

a. The temperature sensor is located in the central cavity.

b. The sensor means comprises at least one connection means via which measured values determined by the temperature sensor can be transmitted to the display and/or contact means.

Advantageously, the immediately preceding features a. and b. are realized together.

By arranging the temperature sensor in the central cavity of the winding, it is possible for the temperature to be detected in the center of the cell, so that, for example in comparison with temperature sensors on the housing of a cell, particularly accurate and meaningful information about the temperature of the cell can be obtained.

Via the connection means, the sensor data that can be detected by means of the temperature sensor can be transmitted to the display means and/or contact means, so that temperature management of the cell is possible by corresponding forwarding and/or evaluation of the data.

In particularly preferred embodiments with respect to the temperature sensor, the cell is characterized by the following feature:

a. The temperature sensor is a temperature dependent resistor or comprises a temperature dependent resistor and the at least one connection means comprises an electrical conductor.

The design of the temperature sensor as a temperature-dependent resistor (for example an NTC element (Negative Temperature Coefficient Thermistor) or a PTC element (Positive Temperature Coefficient Thermistor) allows a particularly cost-effective and practical implementation of a temperature sensor in the cell. NTC and PTC elements can be manufactured in miniaturized form and are therefore particularly suitable as temperature sensor means. Expediently, the temperature-dependent resistor is connected to the display means and/or contact means via electrical conductors that connect to the temperature sensor.

The axial cavity has a length which is generally 85 to 99%, preferably 90 to 99%, of the distance between the end faces of the cell housing. Preferably, the temperature sensor is arranged in a central area of the cavity, in particular in the middle third of the cavity. This measure ensures that the detected temperature values reflect the temperature at a central point inside the winding.

In particularly preferred embodiments, the cell according to the first aspect is provided with the immediately following additional feature:

a. An elongated carrier body, in particular an elongated hollow body, is arranged in the central cavity of the winding.

With the elongated carrier body and in particular with the elongated hollow body, an insertion of the sensor means into the interior of the cell can be realized in a particularly advantageous manner. The elongated carrier body thereby assumes the function of a carrier for the sensors and/or the at least one sensor means.

The elongated hollow body may in particular be an elongated tube which is inserted into the central cavity of the winding during manufacture of the cell or on which the electrodes and the separator are wound. Such a tube, often referred to as a winding core, can prevent deformation of the winding into the central cavity under cyclic loading of the cells and/or prevent collapse of the winding under abuse conditions. For example, a rising gas pressure can be efficiently relieved via a bursting membrane.

The elongated hollow body is preferably designed as a hollow cylinder at least in a partial area, or even completely if necessary.

The elongated hollow body may, for example, have an outer diameter in the range between 1 to 10 mm, in particular between 2 and 7 mm, preferably between 2 and 5 mm. The wall thickness of the elongated hollow body may, for example, be in a range between 0.1 to 1 mm, for example 0.5 mm. For example, an elongated hollow body having an outer diameter of 3 mm may have an inner diameter of 2 mm. In other embodiments, the dimensions may be somewhat larger, for example, an outer diameter of 5 mm and an inner diameter of, for example, 4 mm.

According to a particularly preferred embodiment, the elongated hollow body, in particular in an embodiment as a winding core, is used to place the at least one sensor means or parts thereof in the central cavity of the winding in a particularly advantageous manner. For example, the elongated hollow body can be used as a carrier body to place a temperature sensor and/or a reference electrode in the central cavity.

With respect to the elongated carrier body and in particular the elongated hollow body, also in its embodiment as a winding core, the cell according to the first aspect is characterized in preferred embodiments by at least one of the following additional features:

a. The elongated carrier body consists at least in part of glass and/or ceramic and/or metal and/or plastic.

b. The elongated carrier body is electrically conductive at least in parts or completely.

c. The elongated carrier body is at least partially coated with electrically conductive material.

d. The elongated carrier body is electrically isolated against the housing and/or at least one of the electrodes.

e. The elongated carrier body is sealingly connected to at least one of the end faces of the housing.

In general, it is advantageous if the elongated carrier body is made of an electrolyte-stable material or materials such as glass or stainless steel or an electrolyte-stable plastic such as Teflon. The electrolyte-stable material of the carrier body prevents chemical interaction of the electrolyte with the carrier body.

In a particularly advantageous manner, the elongated carrier body according to the above feature b. is electrically conductive, whereby an electrical contact of the sensor means inside the central cavity of the winding with display means and/or contact means at the end face can be realized without additional electrical conductors. For this purpose, the elongated carrier body may in particular be made of metal according to the above feature a., for example, copper, nickel, stainless steel, aluminum, stainless steel, nickel-plated steel or other alloys. In this embodiment, the carrier body can serve, for example, as an electrical conductor connecting the reference electrode or the lithium depot and/or the temperature sensor described above to the display means and/or the contact means. In this embodiment, for example, one end of the elongated carrier body projecting into the central cavity of the winding may be coated with the reference electrode material, such as metallic lithium or lithium-containing material. The electrical connection of this reference electrode can then be made via the electrically conductive carrier body. However, it is generally then necessary to electrically insulate the carrier body from the cell housing, i.e. to electrically decouple it from the housing and/or at least one of the electrodes according to the immediately preceding feature d.

In other embodiments, the elongated carrier body according to feature c. may also be at least partially coated with an electrically conductive material to realize electrical conductivity, in particular if the elongated carrier body is made of glass and/or ceramics according to feature a. above. In this way, too, an electrical connection of the sensor means located in or on the carrier body can be realized without an additional electrical conductor. If necessary, however, the coating or the carrier body together with the coating must then be electrically insulated from the cell housing.

Particularly advantageous is the electrical decoupling of the elongated carrier body from the housing and/or at least one, preferably both electrodes of the cell according to the immediately preceding feature d., preferably in combination with the immediately preceding feature b. or c. This measure ensures that the sensor system arranged in the cell is operated independently of the voltage state and the charge of the cell, so that, for example, an unintentional discharge of the cell by the sensor system cannot occur.

In general, it is advantageous if the at least one sensor means described herein is operated with its own electrical circuit so that the storage and charging capacities of the cell itself are not affected thereby.

In the case of the reference electrode as sensor means, it is mandatory that the reference electrode, preferably together with the elongated carrier body, is electrically isolated against the housing and the electrodes.

The sealing connection of the elongated carrier body to at least one of the end faces of the housing in accordance with the above feature e. makes it possible to manufacture the cell in a particularly simple manner, wherein the at least one sensor means, together with the elongated carrier body, can be inserted into the interior of the winding during manufacture and the necessary sealing of the housing of the cell is ensured by the sealing connection of the elongated carrier body to the housing or to the end face of the housing. The sealing connection can be realized, for example, by arranging a sealant in between the carrier body and the housing, or by an adhesive, welding, soldering or other connection.

In particular in the case of the temperature sensor and/or the pressure sensor as sensor means, the elongated carrier body can also be electrically non-conductive, for example made of glass and/or ceramic. In these embodiments, for example, a temperature sensor which is arranged in the interior of the winding, can be electrically connected by means of suitable electrical conductors, which are routed in the interior or along the wall of the elongated hollow body to the display means and/or the contact means.

In the case of the temperature sensor it can be useful if there is a good thermal connection to the rest of the interior of the winding via the elongated carrier body; in particular, materials should be used for the elongated carrier body that allow good temperature exchange.

In principle, the elongated carrier body can occupy the entire length of the central cavity of the winding. However, it is also possible for the elongated carrier body to occupy only part of the length of the central cavity, for example a length in the range between 50 and 80% of the total length of the winding.

In another particularly preferred embodiment of the cell according to the first aspect, the cell is characterized by at least one of the immediately following additional features a. and b.:

a. The elongated carrier body is configured for a temperature control of the cell.
  b. The elongated carrier body is in contact with an external temperature control device.

In a preferred manner, the immediately preceding features a. and b. are realized in combination.

In this embodiment, the elongated carrier body is used as a cooling and/or heating body, so that temperature management of the cell is possible in a particularly advantageous manner. A heating capability can be very useful, for example, at low outside temperatures, since a certain minimum temperature is required in particular for a charging process of the cell. Cooling can be particularly advantageous in such cases when excessive heating of the cell takes place, which could negatively affect the function of the cell. Preferably, in this embodiment the carrier body consists at least in part of a metal.

In principle, temperature control of the cell with or, if necessary, without an external temperature control device is also possible without the elongated hollow body inserted in the central hollow body of the winding. However, the use of an elongated carrier body inside the winding is particularly advantageous for temperature control, since the elongated carrier body allows cooling to take place directly in the center of the winding. The cooling can be active or passive. In the case of active cooling, the carrier body should be designed to have a coolant flowing through it. For example, a metal tube is suitable for the elongated carrier body and in particular the elongated hollow body in this context, which can be coupled, for example, with a water cooling system as an external temperature control device for temperature control of the cell. This tube forms an extension of an externally acting cooling system into the interior of the cell.

With reference to said pressure sensor, in preferred embodiments the cell is characterized by at least one of the features a. to c. immediately below:

a. The pressure sensor is located on one of the end faces of the housing.
  b. The sensor means comprises a hollow body projecting into the central cavity, through which the interior space enclosed by the housing is in communication with the pressure sensor.
  c. The pressure sensor is a piezo pressure sensor.

In particularly preferred embodiments, the immediately preceding features a. and b. are realized in combination with each other. A combination of the immediately preceding features a., b. and c. is particularly preferred.

The hollow body according to the above feature b. is preferably the preferred embodiment of the carrier body described above. This hollow body is thus preferably a part of a sensor means, namely the pressure sensor, arranged in the central cavity. The hollow body can be used to communicate pressure changes inside the cavity to the pressure sensor positioned at the end face.

The communicating connection of the hollow body projecting into the central cavity with the pressure sensor arranged on one of the end faces of the housing enables the pressure inside the winding to be detected by means of the pressure sensor. An increasing internal pressure, which can be caused by a gas pressure building up inside the cell, is associated with the risk of the cell rupturing or bursting. In this respect, pressure monitoring represents an important monitoring variable in order to be able to initiate pressure relief or similar measures to prevent hazards if necessary.

The piezo pressure sensor, which in preferred embodiments can be used as a pressure sensor, is a low-cost component that is particularly suitable for the cell according to the first aspect.

In a possible development, the cell is characterized with respect to the pressure sensor by at least one of the immediately following features a. to c.:

a. The pressure sensor delimits the hollow body.
  b. The hollow body is an elongated hollow body, one end of which is bounded by the pressure sensor.

c. The hollow body has at least one opening for pressure-equalizing contact with the winding.

In preferred embodiments, the immediately preceding features a. and b. and in particular features a., b. and c. are realized together.

By delimiting the hollow body, which is located in the central cavity of the winding, with the pressure sensor, the communicating connection between the interior space of the hollow body and the pressure sensor is realized in a particularly simple and practicable manner.

The shape of an elongated tube, which can be inserted into the central cavity of the winding, is particularly suitable for the hollow body.

In this embodiment, it is advantageous if the hollow body has at least one opening via which its interior is connected to the interior space of the cell housing and via which pressure can be equalized between its interior and the space enclosed by the cell housing in which the winding is arranged. The opening or openings in the hollow body can be designed in any way. For example, the end of the hollow body, such as the end of the elongated tube projecting into the interior of the cell or into the interior of the winding, may be configured as an opening. Additionally, or in alternative embodiments, one or more holes or other openings may be provided in the wall of the hollow body. These may be, for example, micro-holes, the total area of the holes being, for example, in the range between 0.1 to 10 mm$^2$, for example about 0.5 mm$^2$. The decisive factor for the design of the at least one opening in the hollow body is that pressure equalization between the region of the winding and the interior of the hollow body takes place as fast as possible.

However, in some further embodiments without a pressure sensor, the interior of the hollow body is preferably isolated in a pressure-tight manner and is not connected to other cavities in the cell via openings and/or apertures.

In the simplest case, the display and/or contact means may be an electrical contact that can be contacted from outside the cell housing and that is electrically connected to the at least one sensor means, e.g., the reference electrode.

In a particularly preferred embodiment of the cell according to the first aspect, the cell is characterized by one of the immediately following additional features a. and b.:

a. The display and/or contact means comprises a PCB board.
   b. The display and/or contact means is a PCB board.
   c. The display and/or contact means is arranged on a PCB board.

A PCB board (Printed Circuit Board) is a board that acts as a carrier for electronic components. Such a PCB generally consists of electrically insulating material that is provided with conductor tracks etched from thin copper layers, for example. The electrically insulating material may, for example, be a glass fiber composite, e.g. based on epoxy resin.

In particularly preferred embodiments, such a PCB board forms or comprises the display and/or contact means of the cell according to the first aspect or is part of the display and/or contact means. In these embodiments, the sensor means is or are directly or indirectly contacted with the PCB board. The PCB board may in this case form part of the housing, in particular the end face or part of the end face of the housing of the cell, or the PCB board is attached to an end face of the housing.

The display and/or contact means may also be the said contact which can be contacted from outside the cell housing, the contact being located on the PCB board.

By interconnecting the at least one sensor means with the PCB board, a connection to further external units, in particular to an external evaluation unit and/or to an external management system of the cell, can be realized in a simple manner.

In principle, as an alternative to a PCB board other contact and/or display means for displaying and/or transmitting the measured values that can be detected by means of the sensor means may be used.

In particularly preferred embodiments of the cell, the cell is characterized with respect to the PCB board by at least one of the immediately following additional features a. and b.:

a. The PCB board has a central recess or aperture for receiving at least one sensor means and/or elongated carrier body as described above.
   b. The PCB board is sealingly connected to a surrounding area of the end face or to the surrounding housing shell.

In particularly preferred embodiments, the immediately preceding features a. and b. are combined.

In a classical or conventional design of a cell in the form of a cylindrical round cell or a button cell, a closure by means of a lid is generally provided on one end face of the cell housing. This side is referred to below as the closure side. The other end face forms the housing bottom.

It is preferred that the display and/or contact means, in particular the PCB board, is arranged on the housing bottom or forms part of the housing bottom, in particular is integrated into it.

Accordingly, it may also be advantageous to introduce the at least one sensor means and, if appropriate, the elongated carrier body into the interior or central hollow body of the winding via the bottom of the housing and to connect them to the outside via contact and/or display means on the bottom side, this connection preferably being made via said PCB board on the end face on the bottom side.

However, it is also possible to integrate the at least one sensor means and/or the display and/or contact means on or in the closure side.

In a particularly preferred manner, the PCB board is provided with a recess or aperture into which the at least one sensor means and/or the at least one part of the sensor means and/or the elongated carrier body can be inserted. In these cases it is expedient to seal this central recess or aperture and likewise to seal the PCB board against the surrounding area of the end face or the adjacent housing shell in order to ensure the function of the cell, which requires a tight housing.

In particularly preferred embodiments, the cell according to the first aspect is characterized by at least one of the immediately following features:

a. The cell is a lithium-ion cell.
   b. The cell is a cylindrical round cell.
   c. The cell is a button cell.

Here, a combination of the immediately preceding features a. and b. or a combination of the immediately preceding features a. and c. is particularly preferred.

Cells according to the first aspect are particularly preferred lithium-ion cells, especially secondary lithium-ion cells. Lithium-ion cells are characterized by particularly high energy densities and can therefore be used with particular advantage for various applications with high energy requirements, for example in the automotive sector. Notwithstanding this, the cell according to the first aspect can also be a cell on a different basis, for example a nickel-metal hydride cell.

In general, the electrodes of lithium-ion cells are usually formed by composite electrodes, each generally comprising an electrically conductive current collector and electrochemically active components (often referred to as active materials) and electrochemically inactive components. This may also be the case according to the present disclosure.

The current collectors have the function of electrically contacting the electrochemically active components over as large an area as possible. They usually consist of ribbon-shaped metal substrates, for example metal foils. They can also be structured, for example perforated or stretched, or they can be formed from a metal foam or from a metal mesh or a metal grid or a metallized nonwoven. The current collector of the negative electrode may, for example, be formed of metals such as copper or nickel and/or be formed of an electrically conductive foil. For the current collector of the positive electrode, suitable base materials include, for example, aluminum or titanium.

In the above-mentioned cases, in which lithium is supplied to the cell from a lithium depot as required or excess lithium is removed from the electrodes to prevent lithium plating, it is preferred that the current collectors are permeable to lithium ions. For this purpose, the current collectors can have apertures, for example, or metallic or metallized nonwovens or open-pored foams can be used as current collectors, but in particular also perforated films or films structured with apertures in some other way.

All materials capable of absorbing and releasing lithium ions can be used as active materials for the electrodes of the secondary lithium-ion cells. In particular, carbon-based materials such as graphitic carbon or non-graphitic carbon materials capable of intercalating lithium can be used for the negative electrode. Lithium titanate ($Li_4Ti_5O_{12}$) is also suitable as an active material. Furthermore, metallic and semi-metallic materials that are alloyable with lithium can be used. For example, the elements tin, antimony and silicon can form intermetallic phases with lithium. In particular, the carbon-based active materials can also be combined with the metallic and/or semi-metallic materials.

For example, lithium metal oxide compounds and lithium metal phosphate compounds such as $LiCoO_2$ and $LiFePO_4$ are suitable for the positive electrode of secondary lithium-ion cells. Furthermore, particularly well suited materials are lithium nickel manganese cobalt oxide (NMC) with the chemical formula $LiNi_xMn_yCo_zO_2$ (where x+y+z is typically 1), Lithium manganese spinel (LMO) with the chemical formula $LiMn_2O_4$, or lithium nickel cobalt alumina (NCA) with the chemical formula $LiNi_xCo_yAl_zO_2$ (where x+y+z is typically 1). Mixtures of said materials can also be used.

As electrochemically inactive components, first and foremost electrode binders and conductive agents are to be mentioned. The electrode binders ensure the mechanical stability of the electrodes and provide contact between the particles of electrochemically active material and the current collector. Common electrode binders are based on polyvinylidene fluoride, polyacrylate or carboxymethylcellulose, for example. Conducting agents such as carbon black have the function of increasing the electrical conductivity of the electrodes.

Porous plastic films, for example made from a polyolefin or a polyether ketone, are particularly suitable as separators for the lithium-ion cells. Nonwovens and fabrics made from these materials can also be used.

As an ion-conducting electrolyte, the lithium-ion cells can contain, for example, a mixture of organic carbonates in which a lithium salt is dissolved. Any lithium salt known from the prior art for lithium-ion cells is suitable for this purpose. A prominent example is lithium hexafluorophosphate ($LiPF_6$). Preferably, the electrodes and separators of the lithium-ion cells are impregnated with the electrolyte.

The described integration of a sensor system is suitable for various types of cells, provided that their anode and cathode are arranged in the form of a winding with a central cavity.

According to feature b. above, in particularly preferred embodiments of the cell according to the first aspect, the cell is a cylindrical round cell.

Cylindrical round cells, as distinguished from button cells, have a height greater than their diameter. They are suitable for supplying electrical energy to modern metering, security and automotive applications such as electricity meters, water meters, gas meters, heating cost consumption meters, medical pipettes, sensors and alarm systems, home alarm systems, sensors and sensor networks, backup batteries for automotive anti-theft systems.

Preferably, the height of the round cells is in the range of 15 mm to 150 mm. The diameter of the cylindrical round cells is preferably in the range from 10 mm to 50 mm. Within these ranges, form factors of, for example, 18×65 (diameter*height in mm) or 21×70 (diameter*height in mm) are particularly preferred. Cylindrical round cells with these form factors are particularly suitable for supplying power to electric drives of motor vehicles and tools.

In one embodiment as a lithium-ion cell, the nominal capacity of the cell, which is designed as a cylindrical round cell, is generally up to 6000 mAh. With the form factor of 21×70, the cell in one embodiment as a lithium-ion cell preferably has a nominal capacity in the range from 2000 mAh to 5000 mAh, particularly preferably in the range from 3000 to 4500 mAh.

In the European Union, manufacturers are strictly regulated in providing information on the nominal capacities of secondary cells and batteries. For example, information on the nominal capacity of secondary nickel-cadmium batteries must be based on measurements according to the IEC/EN 61951-1 and IEC/EN 60622 standards, information on the nominal capacity of secondary nickel-metal hydride batteries must be based on measurements according to the IEC/EN 61951-2 standard, information on the nominal capacity of secondary lithium batteries must be based on measurements according to the IEC/EN 61960 standard, and information on the nominal capacity of secondary lead-acid batteries must be based on measurements according to the IEC/EN 61056-1 standard. Any information on nominal capacities in the present application is preferably also based on these standards.

In embodiments in which the cell according to the first aspect is a cylindrical round cell, the anode current collector, the cathode current collector and the separator are preferably ribbon-shaped and preferably have the following dimensions:

a length in the range from 0.5 m to 25 m a width in the range 30 mm to 145 mm

In these cases, the aforementioned free edge strip, which extends along the first longitudinal edge and which is not loaded with the electrode material, preferably has a width of no more than 5000 μm.

In the case of a cylindrical round cell with the form factor 18×65, the current collectors preferably have a width of 56 mm to 62 mm, preferably 60 mm, and a length of not more than 2 m, preferably not more than 1.5 m.

In the case of a cylindrical round cell with the form factor 21×70, the current collectors preferably have a width of 56 mm to 68 mm, preferably 65 mm, and a length of not more than 3 m, preferably not more than 2.5 m.

Alternatively, the cell according to the first aspect may be a button cell in accordance with the above feature c. Button cells are cylindrical in shape and, in contrast to cylindrical round cells, have a height that is less than their diameter. They are particularly suitable for supplying electrical energy to small electronic devices such as watches, hearing aids and wireless headphones.

In general, button cells have a circular top surface, which is flat at least in a central section, and a circular bottom surface, which is flat at least in a central section, with an annular shell in between. The shortest distance between a point on the flat area or partial area of the top side and a point on the area or partial area of the bottom side is preferably in the range of 4 mm to 15 mm (height of the button cell). The maximum distance between two opposing points on the shell of the button cell is preferably in the range of 5 mm to 25 mm (diameter of the button cell). The requirement here is that the maximum distance between the two points on the mantle side is greater than the distance between the two points on the top and bottom sides. In contrast to a cylindrical round cell, the overall height of the button cell is therefore generally smaller than the overall diameter.

In one embodiment as a lithium-ion cell, the nominal capacity of the cell according to the first aspect in the form of a button cell is generally up to 1500 mAh. Preferably, the nominal capacity is in the range from 100 mAh to 1000 mAh, particularly preferably in the range from 100 to 800 mAh.

Button cells with lithium ion-based windings produced by spirally winding ribbon-shaped electrodes and at least one ribbon-shaped separator are known, for example, from WO 2010/146154 A2, WO 2012/048995 A1 and WO 2010/089152 A1.

Cylindrical round cells and button cells can preferably have a cylindrical housing which consists of, for example, nickel-plated steel or stainless steel. The housing usually comprises two metallic housing parts, between which an electrically insulating seal is arranged. One of the housing parts is in electrical connection with the positive electrode enclosed by the housing and has a positive polarity. The other housing part is in electrical connection with the negative electrode enclosed by the housing and has a negative polarity. The seal is intended to prevent electrical contact between the oppositely poled housing parts. In addition, it is intended to counteract the escape and also the penetration of liquid, moisture or gases from or into the housing.

Preferred Embodiments of the Winding

The ribbon-shaped anode, the ribbon-shaped cathode and the ribbon-shaped separator(s) are preferably wound spirally in the electrode-separator assembly which is shaped in the form of a winding. Preferably, to produce the electrode-separator assembly, the ribbon-shaped electrodes are fed together with the ribbon-shaped separator(s) to a winding device, in which they are preferably wound spirally around a winding axis. Alternatively, the electrodes and the separators may be combined to the assembly and then wound. In some embodiments, the electrodes and separator are wound onto a hollow cylindrical winding core for this purpose, which is seated on a winding mandrel and remains in the winding after winding. The shell of the winding can be formed by a plastic film or an adhesive tape, for example. It is also possible for the winding shell to be formed by one or more turns of the separator.

Preferably the winding has a cylindrical contact sheet metal member or a hollow cylindrical geometry.

It is preferred that the terminal end faces of the electrode-separator assembly which is shaped as a winding are formed by the longitudinal edges of the separator(s). It is further preferred that the longitudinal edges of the anode current collector and/or the cathode current collector do not protrude from the terminal end faces of the winding more than 5000 μm, preferably not more than 3500 μm.

Particularly preferably, the longitudinal edge of the anode current collector protrudes from the end face of the winding no more than 2500 μm, especially preferably no more than 1500 μm. Particularly preferably, the longitudinal edge of the cathode current collector protrudes from the end face of the winding no more than 3500 μm, especially preferably no more than 2500 μm.

Within the electrode-separator assembly, the electrodes are arranged such that the first longitudinal edge of the anode current collector protrudes from one of the terminal end faces of the electrode-separator assembly and the first longitudinal edge of the cathode current collector protrudes from the other terminal end face of the electrode-separator assembly. For this purpose, the anode and the cathode may be offset from each other within the electrode-separator assembly.

It is particularly preferred that the electrochemical cell according to the first aspect comprises two contact sheet metal members, one of which is connected to the free edge strips of the anode current collectors by welding and the other of which is connected to the free edge strips of the cathode current collectors by welding.

Preferred Embodiments of the Current Collectors

The current collectors of the cell according to the first aspect have the function of electrically contacting electrochemically active components contained in the respective electrode material over an area as large as possible. Preferably, the current collectors consist of a metal or are metallized at least on the surface. Suitable metals for the anode current collector include copper or nickel or other electrically conductive materials, in particular copper and nickel alloys or nickel-coated metals. Stainless steel is also generally a possibility. Suitable metals for the cathode current collector are aluminum or other electrically conductive materials, including aluminum alloys. Here, too, stainless steel is still a possibility, for example type 1.4404.

Preferably, the anode current collector and/or the cathode current collector is each a metal foil having a thickness in the range of 4 μm to 30 μm, in particular a ribbon-shaped metal foil having a thickness in the range of 4 μm to 30 μm.

In particularly preferred embodiments, the cathode current collector comprises aluminum or consists of an aluminum alloy or consists of the aluminum or aluminum alloy. Further, the anode current collector preferably comprises aluminum or an aluminum alloy or consists of the aluminum or the aluminum alloy.

In particular, the use of aluminum current collectors on the anode side can bring advantages over the use of copper-based current collectors, for example. Since aluminum is lighter than copper, this can significantly increase the energy density of the cell. In addition, such cells can be very stable against deep discharge and have a reduced tendency to form dendrites.

Particularly preferably, the surface of the current collectors, especially the current collectors based on aluminum or the aluminum alloy, can be coated with a carbon layer, especially to reduce contact resistance. The layer is preferably a few nm to a few μm thick and can be formed, for example, by a deposition from the gas phase, for example by a chemical vapor deposition (CVD) method, or a spraying method.

In addition to foils, other tape-shaped substrates such as metallic or metallized nonwovens or open-pore metallic foams or expanded metals can be used as current collectors.

The current collectors are preferably loaded on both sides with the respective electrode material.

If, in connection with the current collectors, reference is made to an aluminum, copper or nickel alloy, this preferably means an alloy which has a content of at least 70% by weight, preferably at least 90% by weight, of the respective base metal aluminum, copper or nickel.

Special Embodiments of the Housing

In particularly preferred embodiments of the electrochemical cells, the cell is characterized in that the housing, which encloses the electrode-separator assembly, has a metallic, tubular housing part with a terminal circular opening. In the housing, the electrode-separator assembly which is formed as a winding is preferably axially aligned so that the winding shell rests against the inside of the tubular housing part.

In some particularly preferred embodiments, the contact sheet metal member or one of the contact sheet metal members closes the housing or at least one opening of the housing. It may have a circular edge for this purpose. Preferably, the contact sheet metal member closes the terminal circular opening of the tubular housing part. The contact sheet metal member thus not only serves to make electrical contact with an electrode, but also functions as a housing part. This has a major advantage, as a separate electrical connection between the contact sheet metal member and a housing part is no longer required. This creates space within the housing and simplifies cell assembly. In addition, direct connection of a housing part to the current collectors of a cell results in excellent heat dissipation properties of the cell.

Special Embodiments of the Contact Sheet Metal Members

Furthermore, it is preferred that the contact sheet metal member is or comprises a metal disk whose edge corresponds to or forms part of the circular edge of the contact sheet metal member. The metal disk can be arranged in the tubular housing part in such a way that its edge abuts the inside of the tubular housing part along a circumferential contact zone. Furthermore, the edge of the metal disc can be connected to the tubular housing part by a circumferential weld or soldered seam. One of the first longitudinal edges may be connected to the contact sheet metal member, in particular to the metal disk, by welding.

Preferably, the metal disc rests flat on the first longitudinal edge, resulting in a line-shaped contact zone which, in the case of the spirally wound electrodes, has a spiral shape. In some embodiments, the first longitudinal edge may also be bent or deformed.

To enable the edge of the metal disk to abut against the inside of the tubular housing part along the circumferential contact zone, it is preferred that the tubular housing part has a circular cross section at least in the section where the edge of the metal disk abuts. It is expedient that the section is hollow cylindrical for this purpose. The inner diameter of the tubular housing part in this section is correspondingly adapted to the outer diameter of the edge of the contact sheet metal member, in particular to the outer diameter of the metal disk.

The welding of the edge of the metal disc to the tubular housing part can be carried out in particular by means of a laser. Alternatively, however, it would also be possible to fix the metal disk by soldering or bonding.

A separate sealing element is not required for a circumferential welded or soldered seam. The metal disk and the tubular housing part are sealingly connected via the weld seam or the soldering. In addition, the welded or soldered joint also ensures a virtually resistance-free electrical connection between the metal disk and the tubular housing part. In this case, the metal disk and the tubular housing part have the same polarity.

In a further preferred development, the contact sheet metal member is or comprises a metal disc whose edge corresponds to or forms part of the circular edge of the contact sheet metal member, an annular seal made of an electrically insulating material enclosing the circular edge of the contact sheet metal member, in particular the metal disc. Furthermore, the metal disc can be arranged in the tubular housing part in such a way that the annular seal abuts the inside of the tubular housing part along a circumferential contact zone.

In this embodiment, it is thus proposed to use as the contact sheet metal member one with a circular edge, to apply an annular seal made of an electrically insulating material to the circular edge of the contact sheet metal member, and to close the terminal circular opening of the tubular housing part with the contact sheet metal member.

In this case, the cell can be closed, for example, by a beading or a crimping process, whereby the seal is preferably compressed.

The seal can be a conventional plastic seal, which should be chemically resistant to the applicable electrolytes. Suitable sealing materials are known to the skilled person.

The closure variant with the annular seal made of the electrically insulating material results in that the contact sheet metal member is electrically insulated from the tubular housing part. It forms an electrical pole of the cell. In the case of the closure variant in which the edge of the metal disc is joined to the tubular housing part by a circumferential weld or soldered seam, the tubular housing part and the contact sheet metal member have the same polarity.

The contact sheet metal member may consist of a plurality of individual parts, including the metal disk. In some particularly preferred embodiments, the metal disk is the contact sheet metal member.

In the simplest embodiment, the metal disk is a flat sheet metal part with a circular circumference that extends in only one plane. In many cases, however, more elaborate designs may be preferred. For example, the metal disk may be profiled, for example having around its center one or more circular depressions and/or elevations, preferably in concentric arrangement, which may result, for example, in an undulating cross-section. It is also possible for its inner surface to have one or more ridges or linear depressions and/or elevations. Furthermore, the disc may have an edge which is bent radially inwards, so that it has a double-layered edge region with, for example, a U-shaped cross-section, or is bent radially by 90°, so that an L-shaped cross-section results.

In a particularly preferred manner, the metal disk can have at least one channel-shaped and/or point-shaped depression on one of its two sides, which emerges on its other side as at least one linear and/or point-shaped elevation. The side with the at least one elevation may be in direct contact with one of the first longitudinal edges. Furthermore, the at least one elevation and the one of the first longitudinal edges may be connected via at least one welding or soldering spot and/or at least one welding or soldering seam. Preferably, the longitudinal edge is welded or soldered directly to the at least one elevation.

In some embodiments, the one of the first longitudinal edges may be bent or deformed by contact with the at least one elevation.

Furthermore, it may be preferred that beads are introduced as elongated depressions. In a preferred development, the metal disk may have on one of its sides a plurality of channel-shaped depressions in a preferably star-shaped arrangement, the depressions protruding on its other side as linear elevations. Furthermore, the metal disk may have at least one weld or soldered seam in each of the channel-shaped depressions, preferably two parallel weld seams, as a result of welding the metal disk to one of the first longitudinal edges. The star-shaped arrangement and, if necessary, the double weld seam ensure a good and, above all, uniform connection of the metal disc to the one of the first longitudinal edges.

The concept of welding the edges of current collectors with contact sheet metal members is already known from WO 2017/215900 A1 or JP 2004-119330 A. This technology enables particularly high current carrying capacities and low internal resistance. With regard to methods for electrically connecting contact sheet metal members, in particular also disc-shaped contact sheet metal members, to the edges of current collectors, full reference is therefore made to the contents of WO 2017/215900 A1 and JP 2004-119330 A.

Preferred Embodiments of the Housing Comprising a Housing Cup

As stated above, in a preferred embodiment, the housing of the cell according to the first aspect is characterized by comprising a metallic tubular housing part having a terminal circular opening, wherein the contact sheet metal member comprises a circular edge and closes the terminal circular opening of the tubular housing part and the one of the first longitudinal edges is connected to the contact sheet metal member by welding.

In a particularly preferred development, the cell according to the first aspect is characterized with regard to its housing in that the tubular housing part is part of a metallic housing cup which comprises a circular bottom. It may be provided that the other of the first longitudinal edges abuts directly against the bottom and is connected to the bottom preferably by welding.

This variant is particularly suitable for cells according to the closure variant described above with the annular seal made of the electrically insulating material. If the closure variant is used in which the edge of the metal disc is connected to the tubular housing part by a circumferential weld or soldered seam, a pole bushing is generally required.

The use of housing cups has been known for a long time in the construction of cell housings, for example from WO 2017/215900 A1 mentioned above. However, the direct connection of the longitudinal edges of a current collector to the bottom of a housing cup, as proposed here, is not known.

In accordance with the present disclosure, it is therefore possible and in some embodiments preferred to couple the current collector edges of the positive and negative electrodes protruding from opposite end faces of an electrode-separator assembly which is formed as a winding directly to a housing part in each case, namely the bottom of the cup and the contact sheet metal member described above, which acts as a closure element. The use of the available internal volume of the cell housing for active components thus approaches its theoretical optimum.

Preferred Embodiments of the Housing Materials

The choice of material from which the housing cup, the contact sheet metal member and its possible components are made depends mostly on whether the anode or the cathode current collector is attached to the respective housing part. Preferred materials are basically the same materials from which the current collectors themselves are made. For example, said housing parts may consist of the following materials:

Alloyed or unalloyed aluminum, alloyed or unalloyed titanium, alloyed or unalloyed nickel, alloyed or unalloyed copper, stainless steel (for example type 1.4303 or 1.4404), nickel-plated steel.

Furthermore, the housing and its components may consist of multi-layered materials (Clad Materials), for example comprising a layer of steel and a layer of aluminum or copper. In these cases, the layer of aluminum or the layer of copper forms, for example, the inside of the housing cup or the bottom of the housing cup. Other suitable materials are known to the skilled person.

In a particularly preferred embodiment, the cell according to the present disclosure is characterized in that the contact sheet metal member comprises aluminum or an aluminum alloy or consists of the aluminum or aluminum alloy. In this embodiment, the anode current collector may be assembled to the contact sheet metal member by welding and the cathode current collector may be assembled to the closure member by welding.

This embodiment is particularly preferred if the anode current collector and the cathode current collector also each consist of aluminum or an aluminum alloy.

If, in connection with the housing materials, reference is made to an aluminum, copper or nickel alloy, this preferably means an alloy which has a content of at least 70% by weight, preferably at least 90% by weight, of the respective base metal aluminum, copper or nickel.

Further Particular Embodiments of the Cell

In a particularly preferred embodiment of the first aspect, the cell is characterized in that an end face of the housing and preferably the contact sheet metal member has a safety valve via which pressure can escape from the housing if a pressure threshold value is exceeded.

This safety valve can, for example, be a bursting diaphragm, a bursting cross or a similar predetermined cracking point, which can rupture at a defined overpressure in the cell in order to prevent an explosion of the cell. Particularly preferably, the metal disk of the contact sheet metal member can have the safety valve, in particular in the form of a predetermined cracking point.

In a particularly preferred embodiment of the cell according to the first aspect, the cell is part of a battery module comprising several electrically interconnected, preferably identical electrochemical cells. Such battery modules are particularly suitable for applications in the automotive sector. Particularly in such applications, which are associated with a high power consumption and a high power output, reliable monitoring systems are useful and important in order to be able to detect irregular operating states in good time and, if necessary, eliminate them.

According to a second aspect of the disclosure, a method is provided for manufacturing a cell according to the first aspect, said method being characterized in particular by the following steps:

a. A cylindrical winding is provided having a central cavity comprising a spirally wound assembly of at least one ribbon-shaped negative electrode, at least one separator, and at least one ribbon-shaped positive electrode.

b. A cup-shaped housing part is provided which includes an annular housing shell, a housing bottom, and an end face opening.

c. The winding is inserted into the housing part through the end face opening.

d. The end face opening is closed by a second, preferably disc-shaped housing part, for example by means of a flanging process.

e. The winding is soaked with an electrolyte.

f. At least one sensor means or at least part of a sensor means, which can qualitatively and/or quantitatively detect changes in the state of the winding, is introduced into the central cavity of the winding.

g. A display means and/or contact means is arranged at the housing bottom, which can display measured values detected by the at least one sensor means and/or via which these measured values can be transmitted to a receiving and/or evaluation unit.

The specified steps do not have to be carried out in the specified sequence. For example, it is possible to arrange the display and/or contact means at the housing bottom before or after insertion of the winding. The sensor means can also be placed before or after the winding is inserted at the housing bottom. The impregnation of the winding with electrolyte does not necessarily have to take place before the sensor means is inserted or after the end face opening is closed. In general, however, it is preferable to impregnate the winding with the electrolyte after the winding has been inserted into the housing.

With regard to preferred embodiments of the cell components used in the process steps, reference is made to the above description of the cell according to the first aspect in order to avoid repetition.

The negative electrode and the positive electrode are preferably electrically contacted with the housing or with electrical conductors that can be passed through the housing after steps c. and d. above, but preferably before step e. above.

In particularly preferred embodiments of the manufacturing process, the at least one sensor means or the at least one part of a sensor means is inserted and in particular pushed into the central cavity of the winding together with the elongated carrier body described above and in particular with the elongated hollow body described above. This measure permits a particularly simple manufacture of the cell with relatively few manual operations, so that this manufacturing process is particularly suitable for automated manufacturing.

The sensor means or parts of sensor means are preferably introduced into the interior or into the central cavity of the winding via a central recess or aperture in one of the end faces of the housing, in particular in the housing bottom. In a particularly preferred manner, this insertion of the sensor means or parts of the sensor means is done together with the elongated carrier body, if provided, which is inserted into the central cavity of the winding. The central recess or aperture may, for example, be located within the PCB board, if provided, which may form part of the housing bottom or may close the housing, thereby forming the contact and/or display means of the cell in the manner described above.

In a particularly preferred embodiment of the manufacturing process, this central opening in the housing bottom and possibly in the PCB board is used to dose the electrolyte or introduce it into the interior of the cell. In this context, it may be provided, for example, that first the electrolyte is dosed in and then the elongated carrier body is introduced into the interior or into the central cavity of the winding. Then the housing is sealed at the housing bottom. This can be done, for example, by gluing, soldering or welding the existing joints and contact areas.

The remaining production of the cell, for example a beading of the lid and others, can be carried out in a manner known per se, as is known in particular for cylindrical round cells or button cells.

The arrangement of the optionally provided pressure sensor can, for example, take place on the surface of the optionally provided PCB board or in the recess or aperture in the PCB board, whereby this pressure sensor is preferably in communicating connection with the interior of the optionally provided elongated carrier body designed as a hollow body, so that pressure fluctuations or pressure changes from the interior of the winding are transmitted directly to the pressure sensor.

The integration of the sensor means or parts of the sensor means into the inside of the winding can also be realized in another way, for example by means of a plastic seal or a glass-to-metal bushing, instead of using an end-face PCB board.

The PCB board preferably has contacts that can be drawn off in a manner known per se. For further processing and/or evaluation of the signals, for example, a wired or wireless connection to further evaluation and/or processing units can be provided. The contact points of the PCB board can, for example, be wired in a customary manner to accomplish signal routing to external units. Signal forwarding can also be wireless, if necessary, although wired signal forwarding is generally preferred due to the lower power requirements.

In this way, for example, a central battery management system can be implemented when a plurality of individual cells are interconnected. For example, between ten and a thousand, for example a hundred, individual cells can be interconnected and monitored and controlled with a common battery management and monitoring system.

During assembly, the PCB board can be inserted, for example, into a corresponding circular recess of the metallic housing provided if necessary, in particular on the bottom side of the housing. After insertion of the sensor means and, if applicable, the elongated carrier body and, if applicable, the electrolyte, the PCB can be sealingly bonded, welded or, for example, soldered. In addition to the function of contacting and, if necessary, displaying and/or forwarding signals, the PCB board also performs a sealing function.

In the embodiment cell having the at least one contact sheet metal member, a central recess may be provided in one of the contact sheet metal members for insertion of the or the sensor means or parts of a sensor means into the interior or central cavity of the winding.

Further features and advantages will be apparent from the following description of examples of embodiments in conjunction with the drawings. In this connection, the individual features may each be realized separately or in combination with one another.

FIG. 1 shows a schematic external view of a cylindrical round cell 10, wherein in this depiction the details of the arrangement of the sensor means are not shown. The cell 10 comprises a housing with a first (lid-side) end face 11 and a second (bottom-side) end face 12 and with an annular housing shell 13. The end face 11 comprises the positive pole 16 of the cell 10. The bottom-side end face 12 forms the negative pole of the cell.

This housing is designed to accommodate a winding which is an assembly of at least one negative electrode, at least one separator and at least one positive electrode. The winding can be stabilized, for example, by means of additional adhesive tapes. The assembly of the electrodes and the separator is wound around a winding axis indicated as dashed line 14 in FIG. 1. This winding axis 14 passes through a central cavity which is comprised by the winding (not shown here). An elongated hollow carrier body 15 is arranged in this central cavity. This carrier body 15 can be provided for receiving one or more sensor means or can itself be part of a sensor means.

In other embodiments, such a carrier body 15 may be omitted, and in any case at least one sensor means or at least part of a sensor means is arranged in the central cavity comprised by the winding.

Figure 2:
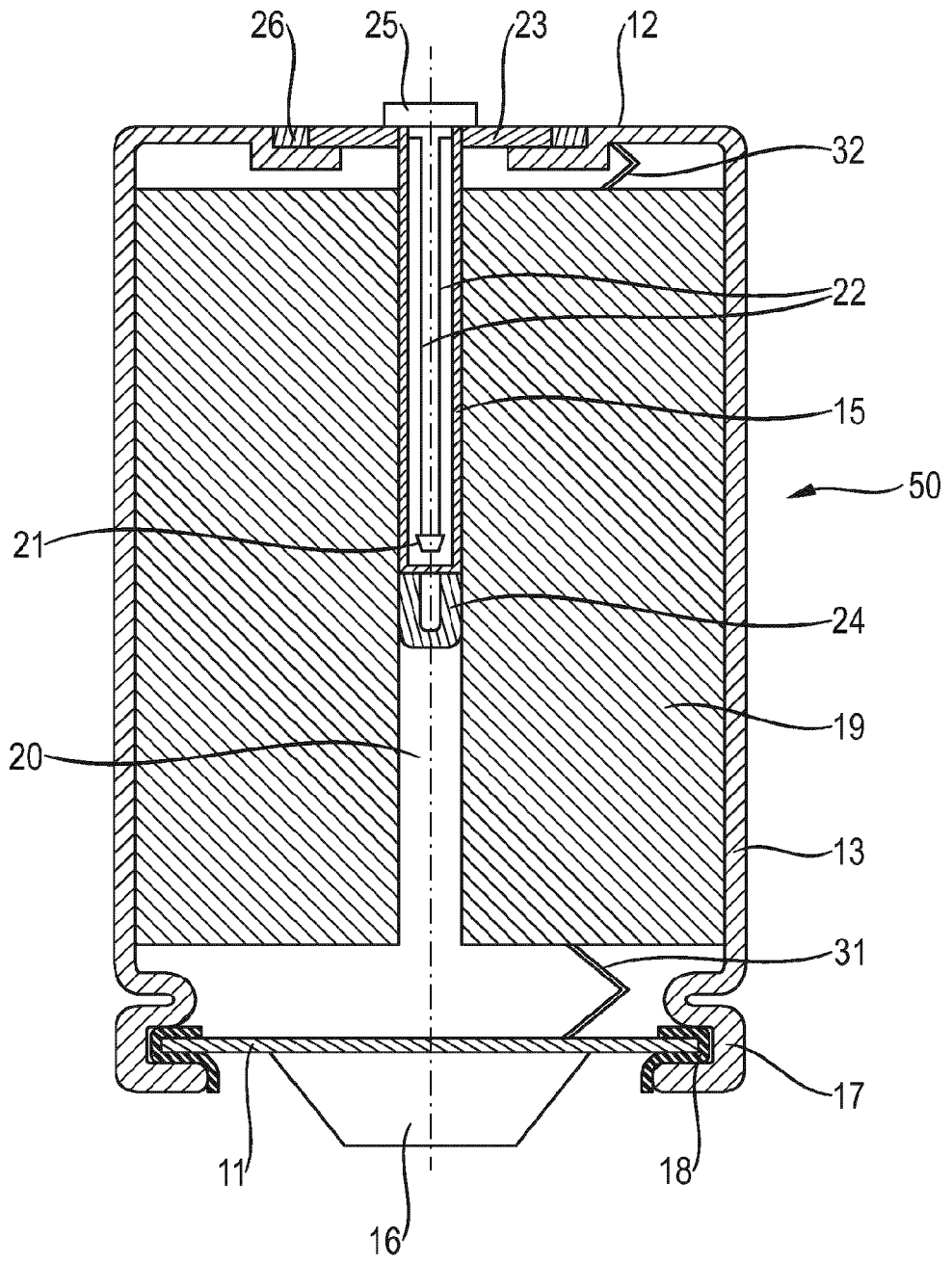
FIG. 2 provides a sectional view of an embodiment of a cell.

FIG. 2 shows a cell 50 in cross-section with further details. The elements corresponding to those explained in FIG. 1 are given the same reference numbers. In this illustration, the bottom end face 12 is shown at the top. The lid 11 is fixed to the housing shell 13 by means of the flanging 17. The seal 18 insulates the lid 11 from the housing shell 13. The winding 19 is located inside the housing. One of the electrodes of the winding 19 is electrically connected to the lid 11 and thus also to the pole 16 via the conductor 31. The second electrode of the winding 19 is electrically connected to the bottom end face 12 via the conductor 32.

The winding 19 comprises the central cavity 20. Within the central cavity 20, the elongated hollow carrier body 15 is arranged. Inside the hollow carrier body 15 is an NTC element as a temperature sensor 21. The temperature sensor 21 is led to the outside via a pair of electrical conductors 22 and contacts a PCB board 23, which is part of the bottom end face 12 of the housing.

In this embodiment, the elongated carrier body 15 additionally has the function of a reference electrode 24 by providing a metallic coating with a defined potential at the end of the carrier body 15 facing away from the end face 12, preferably a coating with metallic lithium or optionally with another lithium-containing material.

In this embodiment as a reference electrode, the elongated carrier body 15 preferably consists of a metallic material, for example copper, or has electrical conductivity, for example by being coated with a corresponding material, so that an absolute voltage difference between the reference electrode 24 and the anode or the cathode of the winding 19 can be drawn off by means of the reference electrode 24 in the region of the end face 12.

Further, in this embodiment, a pressure sensor 25 is disposed on the PCB board 23 in communication with the interior of the hollow carrier body 15. Here, the hollow carrier body 15 is provided with at least one opening not shown in more detail here, so that pressure equalization takes place between the interior space of the elongated carrier body 15 and the surrounding interior space within the cell 50.

Thus, in the context of the pressure sensor 25, the hollow carrier body 15 constitutes part of the sensor means, as the changing pressure, if any, within the cell 50 is transmitted through the hollow carrier body 15 to the pressure sensor 25 located at the end face.

The PCB board is sealingly inserted into a corresponding recess in the bottom end face 12 of the housing, with a circumferential seal 26 being provided. In other embodiments, for example, bonding, welding, soldering or the like may be provided instead.

The use of a PCB board 23 as contact and/or display means for the sensor system offers an easy-to-implement and advantageous design option for contacting the sensor system. Likewise, it is also possible to use, for example, a comparable plate made of glass or plastic or the like instead of the PCB board 23 and to provide for contacting of the sensor system in another way.

Figure 3:
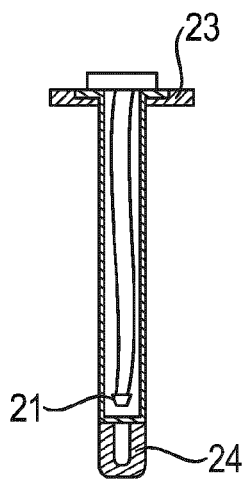
FIG. 3 provides a sectional view of a further embodiment of a cell.

FIG. 3 shows a section with regard to the sensor system from a cell, which is largely comparable with the cell 50 in FIG. 2 or the cell 100 explained below with reference to FIG. 5. In contrast, the embodiment shown in FIG. 3 does not include a pressure sensor. The cell shown here comprises a combination of a reference electrode 24 and an NTC element as temperature sensor 21, which are connected to an end-face PCB board 23 or a comparable element. The section illustrates the elements that can be inserted into the central cavity of the winding of the cell during fabrication of a cell, so as to integrate the sensor system into the cell.

Figure 4:
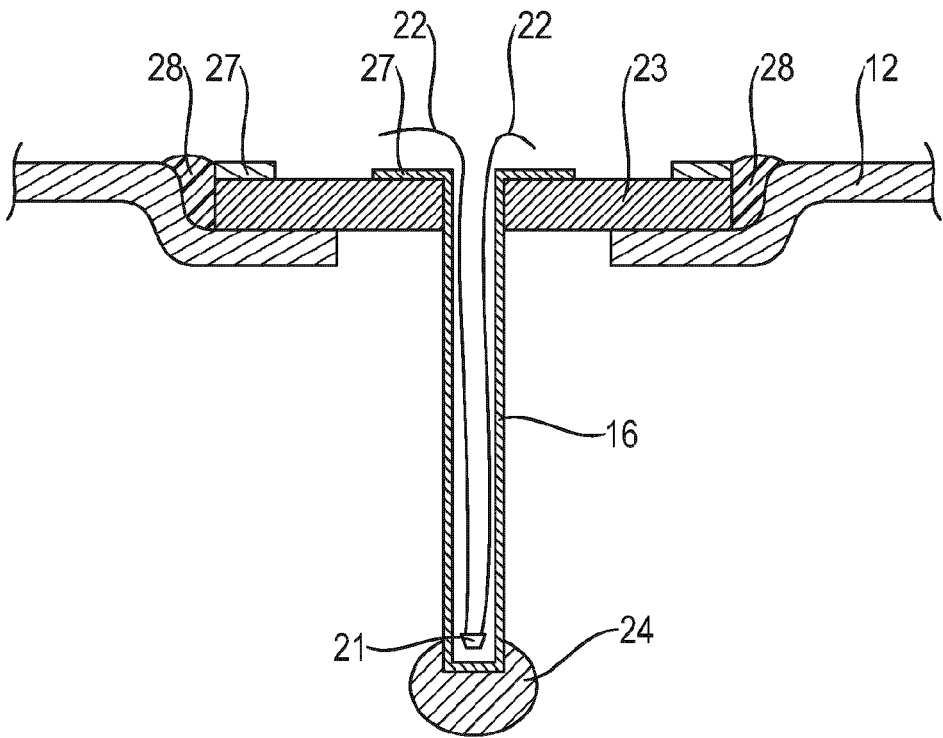
FIG. 4 provides a sectional view of a further embodiment of a cell.

FIG. 4 also illustrates a section of a cell with a reference electrode 24, which is drop-shaped in this case, and an NTC element as temperature sensor 21. These sensor means are arranged on or in the elongated and hollow carrier body 15. The leads 22 of the temperature sensor 21 are led to the outside and are provided for contact with the conductor structures 27 of the PCB board 23.

The PCB board 23 is inserted into a corresponding recess or aperture in the bottom end face 12 of the cell and is sealingly inserted into the housing, for example, with solder 28 or an adhesive or other sealant.

Figure 5:
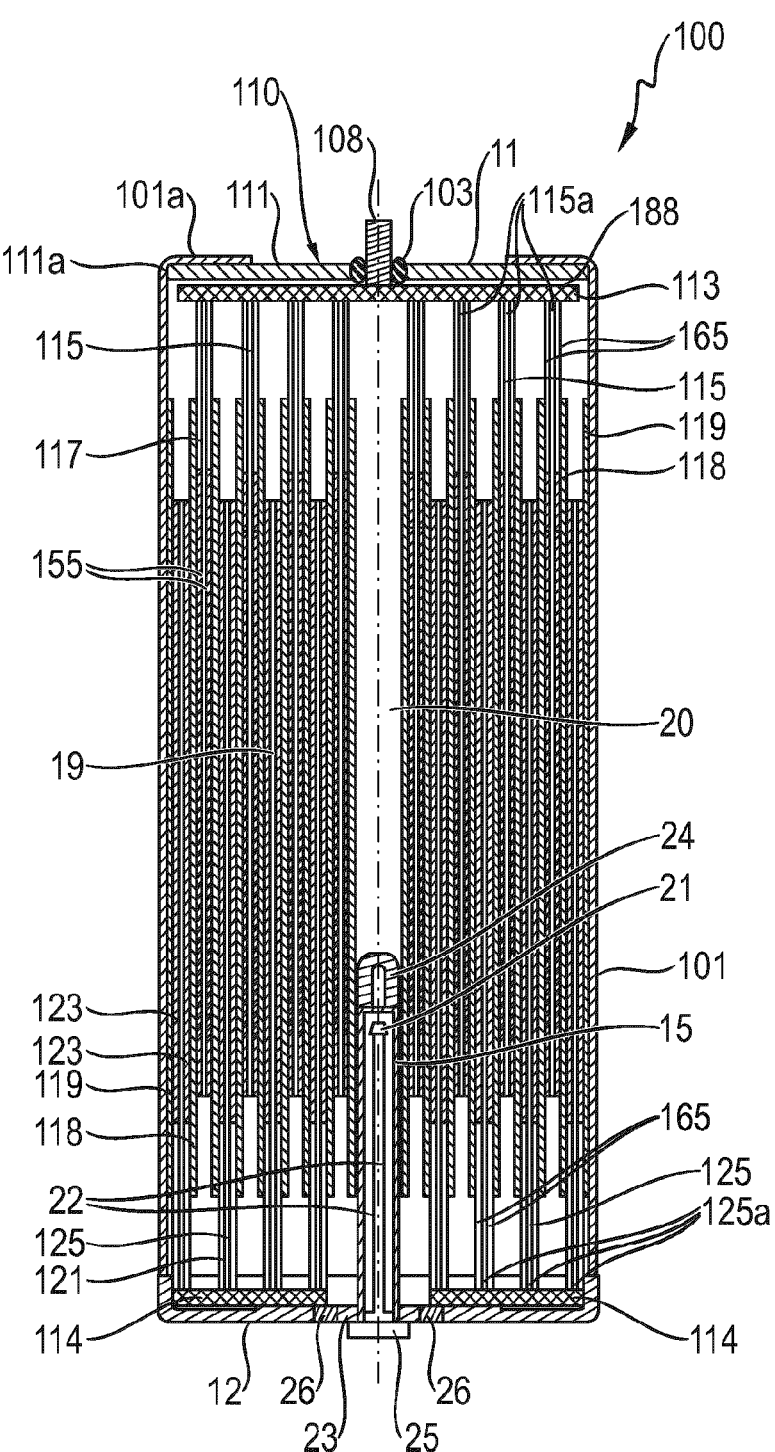
FIG. 5 provides a sectional view of a cylindrical round cell with contact sheet metal members.

The cell 100 illustrated in FIG. 5 shows a cell with contact sheet metal members in which the longitudinal edges 115a, 125a of the current collectors projecting from the winding 19 are directly connected to contact sheet metal members 113 and 114 arranged on the end faces. Furthermore, similar to FIG. 2, the winding 19 comprises the central cavity 20. Within the central cavity 20, the elongated carrier body 15 is arranged in the form of a hollow body. Within the hollow carrier body 15 is an NTC element as a temperature sensor 21. The temperature sensor 21 is led to the outside via a pair of electrical conductors 22 and contacts a PCB board 23, which is part of the bottom end face 12 of the housing.

In this embodiment, the elongated carrier body 15 additionally has the function of a reference electrode 24 by providing a metallic coating with a defined potential at the end of the carrier body 15 facing away from the end face 12, preferably a coating with metallic lithium or optionally with another lithium-containing material.

In this embodiment the elongated carrier body 15 preferably consists of a metallic material, for example copper, or has electrical conductivity, for example by being coated with a corresponding material, so that a voltage difference between the reference electrode 24 and the anode or the cathode of the winding 19 can be drawn off by means of the reference electrode 24 in the region of the end face 12.

Further, in this embodiment, a pressure sensor 25 is disposed on the PCB board 23 in communication with the interior of the hollow carrier body 15. Here, the hollow carrier body 15 is provided with at least one opening not shown in more detail here, so that pressure equalization takes place between the interior space of the elongated carrier body 15 and the surrounding interior space within the cell 100.

Thus, in the context of the pressure sensor 25, the hollow carrier body 15 constitutes part of the sensor means, as the changing pressure, if any, within the cell 100 is transmitted through the hollow carrier body 15 to the pressure sensor 25 located at the end face.

The PCB board is sealingly inserted into a corresponding recess in the bottom end face 12 of the housing, with a circumferential seal 26 being provided. In other embodiments, for example, bonding, welding, soldering or the like may be provided instead.

The use of a PCB board 23 as contact and/or display means for the sensor system offers an easy-to-implement and advantageous design option for contacting the sensor system. Likewise, it is also possible to use, for example, a comparable plate made of glass or plastic or the like instead of the PCB board 23 and to provide for contacting of the sensor system in another way.

Further details of the cell 100 are explained below.

The cell 100 comprises a hollow cylindrical housing part 101 which, together with the bottom 12 and the lid 11, forms the housing of the cell. The lid 111 is formed as a metal disk with a circular circumference. In the area of the lid 11, the housing part 101 has a circular opening (defined by the rim 101a) which is closed by the lid 11. The housing of the cell encloses an interior space in which an electrode-separator assembly formed as a hollow cylindrical winding 19 is axially aligned. The lid 111 is disposed within the tubular housing part 101 such that its edge 111a abuts the inner surface of the tubular housing part 101 along a circumferential contact zone. The edge 111a is connected to the tubular-shaped housing part 101 by a circumferential welded or soldered seam. The edge 101a of the tubular housing part 101 is bent radially (here by about 90°) inwardly over the edge of the metal disk 111.

The electrode-separator assembly is in the form of a cylindrical winding 19 with two terminal end faces, between which a circumferential winding shell extends which rests against the inside of the hollow-cylindrical housing part 101. It is formed of a positive electrode and a negative electrode and separators 118 and 119, each of which is ribbon-shaped and spirally wound. The two end faces of the electrode-separator assembly or winding 19 are formed by the longitudinal edges of the separators 118 and 119. The current collectors 115 and 125 project from these end faces. The cathode current collector 125 may consist of aluminum, for example. The anode current collector 115 may consist of copper, nickel, or aluminum, for example.

The anode current collector 115 protrudes from the upper end face of the electrode-separator assembly, and the cathode current collector 125 protrudes from the lower end face. The anode current collector 115 is loaded in a strip-shaped main region with a layer of a negative electrode material 155. The cathode current collector 125 is loaded in a strip-shaped main region with a layer of a positive electrode material 123. The anode current collector 115 has an edge strip 117 extending along its longitudinal edge 115a, which is not loaded with the electrode material 155. Instead, a coating 165 of a ceramic support material is applied here as an optional measure to stabilize the current collector in this area. The cathode current collector 125 has an edge strip 121 extending along its longitudinal edge 125a, which is not loaded with the electrode material 123. Instead, the optional coating 165 of the ceramic support material is also applied to this area.

The lid 111 is electrically connected to the contact sheet metal member 110 via the pole pin 108. The metal contact sheet metal member 113 comprises two sides, one of which, in the figure the top side, faces toward the lid 111. On the other side of the contact sheet metal member 113, in this case the lower side, the longitudinal edge 115a is in direct contact with the contact sheet metal member 113 over its entire length and thus in electrical contact with the lid 111, and is connected to the latter by welding.

In preferred embodiments, the lid 111, the contact sheet metal member 113, and the pole pin together form a lid assembly 110 that can be assembled in a single step.

The pole pin 108 is welded or soldered to the contact sheet metal member 113 and extends out of the housing of the cell 100 through a central aperture in the metal disk 111. The lid assembly 110 further comprises the insulating means 103, which electrically insulates the pole pin 108 and thus also the contact sheet metal member 113 welded or soldered to the pole pin from the lid 111. Only the lid 111 is in direct contact with, and thus in electrical contact with, the housing part 101. The pole pin 108 and the contact sheet metal member 113 are insulated from the housing cup.

The edge 125a of the cathode current collector 125 is, preferably over its entire length, in direct contact with the contact sheet metal member 114. The edge 125a is assembled with the contact sheet metal member 114 by welding (in particular by means of a laser). The contact sheet metal member 114 is functionally similar to the contact sheet metal member 113 on the opposite end face of the cell, However, the contact sheet metal member 114 has a central recess for the elongated carrier body 15 to pass through. The contact sheet metal member 114 is electrically conductively connected to the bottom 12 of the housing, for example by welding.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrochemical cell, comprising:
   a winding comprising a ribbon-shaped negative electrode comprising an anode current collector and an electrochemically active anode component applied to the anode current collector and a ribbon-shaped positive electrode comprising a cathode current collector and an electrochemically active cathode component applied to the cathode current collector, wherein an assembly comprises the negative electrode and the positive electrode, wherein the negative electrode and the positive electrode are separated from each other by a separator, wherein the assembly is wound spirally around a winding axis to form the winding, wherein the winding comprises a central cavity through which the winding axis passes, wherein the winding further comprises two terminal end faces and a circumferential winding shell, wherein the negative electrode and the positive electrode are configured and/or arranged within the assembly relative to each other such that a protruding longitudinal edge of the anode current collector protrudes from one of the terminal end faces and a protruding longitudinal edge of the cathode current collector protrudes from the other of the terminal end faces of the winding;

a contact sheet metal member in direct contact with a respective protruding longitudinal edge and connected to the respective protruding longitudinal edge by welding, wherein the respective protruding longitudinal edge is the protruding longitudinal edge of the anode current collector or the protruding longitudinal edge of the cathode current collector, a housing having a first end face, a second end face, and an annular housing shell sealingly enclosing an interior space in which the winding is disposed;

a sensor apparatus configured to qualitatively and/or quantitatively detect changes in a state of the winding, the sensor apparatus comprising a pressure sensor and an elongated hollow body projecting into the central cavity, the elongated hollow body providing a communicating connection between the pressure sensor disposed at one of the end faces of the housing and an interior space enclosed by the housing; and a display and/or a contact configured to display measured values detected by the sensor apparatus and/or via which the measured values can be transmitted to a receiver and/or an evaluator.

2. The electrochemical cell according to claim 1, wherein the sensor apparatus further comprises at least one of:

a reference electrode, and/or a temperature sensor.

3. The electrochemical cell according to claim 2, wherein:

the reference electrode is located in the central cavity, and/or the sensor apparatus comprises at least one connector via which measured values determined by the reference electrode are configured to be transmitted to the display and/or the contact.

4. The electrochemical cell according to claim 3, wherein:

the reference electrode comprises lithium or a lithium-containing material, and the at least one connector is an electrical conductor.

5. The electrochemical cell according to claim 2, wherein:

the temperature sensor is located in the central cavity, and/or the sensor apparatus comprises at least one connector via which measured values determined by the temperature sensor are configured to be transmitted to the display and/or the contact.

6. The electrochemical cell according to claim 5, wherein:

the temperature sensor is a temperature-dependent resistor or the temperature sensor comprises a temperature-dependent resistor, and the connector comprises an electrical conductor.

7. The electrochemical cell according to claim 1, wherein:

the elongated hollow body comprises glass and/or ceramic and/or metal and/or plastic, the elongated hollow body is electrically conductive at least in parts or completely, the elongated hollow body is at least partially coated with electrically conductive material, the elongated hollow body is electrically isolated against the housing and/or at least one of the negative electrode or the positive electrode, and/or the elongated hollow body is sealingly connected to at least one of the end faces of the housing.

8. The electrochemical cell according to claim 1, wherein:

the pressure sensor is disposed at one of the end faces of the housing.

9. The electrochemical cell according to claim 1, wherein the elongated hollow body is in contact with an external temperature control device.

10. The electrochemical cell according to claim 1, wherein the display and/or contact:

is or comprises a PCB board, and/or is arranged on a PCB board.

11. The electrochemical cell according to claim 10, wherein:

the PCB board has a central recess or aperture for receiving a portion of the elongated hollow body, the PCB board is sealingly connected to a surrounding area of an end face of the winding or to the annular housing shell, and the PCB board forms part of the housing.

12. The electrochemical cell according to claim 1, wherein:

the electrochemical cell is a cylindrical round cell or a button cell.

13. The electrochemical cell according to claim 1, wherein the pressure sensor comprises a piezo pressure sensor.

14. The electrochemical cell according to claim 1, wherein the cell is a lithium-ion cell.

15. A method of manufacturing an electrochemical cell according to claim 1, the method comprising:

providing the winding;

providing a cup-shaped housing part having the annular housing shell, a housing bottom, and an end face opening;

inserting the winding into the cup-shaped housing part through the end face opening;

closing the end face opening by a second housing part;

soaking the winding with an electrolyte;

introducing at least a portion of the sensor apparatus into the central cavity of the winding; and arranging the display and/or the contact on the housing bottom.

* * * * *